US011159004B2

(12) United States Patent
Cohen

(10) Patent No.: US 11,159,004 B2
(45) Date of Patent: Oct. 26, 2021

(54) ADJUSTABLE RECESSED BOX

(71) Applicant: Brandon Cohen, Vernon, CA (US)

(72) Inventor: Brandon Cohen, Vernon, CA (US)

( * ) Notice: Subject to any disclaimer, the term of this patent is extended or adjusted under 35 U.S.C. 154(b) by 30 days.

(21) Appl. No.: 16/732,247

(22) Filed: Dec. 31, 2019

(65) Prior Publication Data

US 2021/0203143 A1    Jul. 1, 2021

(51) Int. Cl.
*H02G 3/08* (2006.01)
*H02G 3/12* (2006.01)

(52) U.S. Cl.
CPC ............. *H02G 3/12* (2013.01); *H02G 3/083* (2013.01)

(58) Field of Classification Search
CPC .......... H02G 3/08; H02G 3/081; H02G 3/083; H02G 3/12; H02G 3/121; H02G 3/123; H02G 3/125; H02G 3/126; H02G 3/10; H05K 5/00; H05K 5/02; H05K 5/0204; H05K 5/0217
USPC ....... 174/480, 481, 50, 53, 57, 58, 535, 542, 174/560, 559, 54, 61, 63; 220/3.2–3.9, 220/4.02; 248/906, 343, 317, 342
See application file for complete search history.

(56) References Cited

U.S. PATENT DOCUMENTS

| | | | | |
|---|---|---|---|---|
| 1,982,957 A | * | 12/1934 | Knell | H02G 3/126 220/3.9 |
| 4,050,603 A | * | 9/1977 | Harris | H02G 3/126 220/3.9 |
| 4,062,512 A | * | 12/1977 | Arnold | H02G 3/126 248/309.1 |
| 5,114,105 A | * | 5/1992 | Young | H02G 3/126 248/27.1 |
| 5,954,304 A | * | 9/1999 | Jorgensen | H02G 3/125 248/200.1 |
| 6,491,270 B1 | * | 12/2002 | Pfaller | H02G 3/125 248/200.1 |
| 7,628,286 B2 | * | 12/2009 | Lalancette | H02G 3/126 220/3.6 |

(Continued)

OTHER PUBLICATIONS

DMF DRDHNJ Junction Box frame-in-kit Product Publicly available at least as early as Dec. 13, 2018 Website: https://www.dmflighting.com/product/drdhnj/.

(Continued)

*Primary Examiner* — Angel R Estrada
(74) *Attorney, Agent, or Firm* — Eric Kelly

(57) ABSTRACT

A system for adjusting a junction box, to be recessed with respect to a ceiling, between a minimum ceiling thickness and a maximum ceiling thickness, utilizes a pair of hanger-bar-to-box-attachment-devices that are attached to both the junction box and to a pair of hanger-bars. The pair of hanger-bar-to-box-attachment-devices are attached to the junction box in an adjustable manner that is vertically slidable and lockable along a finite vertical path. And the pair of hanger-bar-to-box-attachment-devices that are also attached to the pair of hanger-bars, are adjustable in a horizontally slidable and lockable manner along a finite horizontal path, defined by a length of the pair of hanger-bars. The junction box may also have a set of height-markings on its exterior to facilitate adjusting the junction box to a desired height with respect to a given ceiling.

20 Claims, 11 Drawing Sheets

(56) References Cited

U.S. PATENT DOCUMENTS

| | | | | |
|---|---|---|---|---|
| 7,645,936 B2 * | 1/2010 | Magno, Jr. | ............... | H02G 3/14 |
| | | | | 174/53 |
| 7,654,495 B2 * | 2/2010 | Adrian | ................. | F04D 25/088 |
| | | | | 248/200.1 |
| 9,035,175 B2 * | 5/2015 | Korcz | .................... | H02G 3/086 |
| | | | | 174/50 |

OTHER PUBLICATIONS

Juno IC1 JB Junction Box Housing Product Publicly available at least as early as Dec. 13, 2019 Website: https://www.acuitybrands.com/en/products/detail/845886/juno/ic1jb-housing/4-ic-rated-new-construction-junction-box-housing.

* cited by examiner

ADJUSTABLE RECESSED BOX

TECHNICAL FIELD OF THE INVENTION

The present invention relates in general to junction boxes and more specifically to means for recessing a junction box with respect to a ceiling (or other surface) in an adjustable manner.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Currently (circa 2019), a pair of hanger-bars are often installed between adjacent joists, above a ceiling, for the purposes of mounting a junction box to that pair of hanger-bars. That junction box may then receive various electrical components, such as light fixtures and/or fans. These pre-existing junction boxes often cannot be adjusted up or down (vertically) with respect to its hanger-bars, joists, and/or ceiling; which can greatly increase installation times by making sure the hanger-bars are attached to proper locations on the adjacent joists to yield a desired recessed positioning of the junction box with respect to that ceiling. However, because different ceilings may have different thicknesses (and/or because the spacing between joists and the ceiling may vary), each install scenario is currently always a custom install, according to those specific and possibly unique measurements. It would There is a need in the art for a system and/or a single set of devices that may be used to install a junction box in a recessed position with respect to a ceiling, wherein that system and/or that single set of devices may be used to install the junction box over a range of ceilings with different thicknesses and still achieve the desired recessed position, wherein that range may be defined from a maximum ceiling thickness to a minimum ceiling thickness. There is a need for the junction box to be height/vertically/up-down adjustable with respect to its hanger-bars, joists, and/or ceiling.

It is to these ends that the present invention has been developed.

BRIEF SUMMARY OF THE INVENTION

To minimize the limitations in the prior art, and to minimize other limitations that will be apparent upon reading and understanding the present specification, the present invention describes a hanger-bar-to-box-attachment-device, a junction box, hanger-bars, and assemblies thereof.

For example, and without limiting the scope of the present invention, a system for adjusting a junction box, to be recessed with respect to a ceiling, between a minimum ceiling thickness and a maximum ceiling thickness, may be described. In some embodiments, the system may utilize a pair of hanger-bar-to-box-attachment-devices that are attached to both the junction box and to a pair of hanger-bars. The pair of hanger-bar-to-box-attachment-devices are attached to the junction box in an adjustable manner that is vertically slidable and lockable along a finite vertical path defined by vertical slot in a back-plate of the hanger-bar-to-box-attachment-device. And the pair of hanger-bar-to-box-attachment-devices that are also attached to the pair of hanger-bars, may be adjusted in a horizontally slidable and lockable manner along a finite horizontal path, defined by a length of the pair of hanger-bars. The junction box may also have a set of height-markings on its exterior to facilitate adjusting the junction box to a desired height with respect to a given ceiling.

It is an objective of the present invention to provide a single set of devices that may permit installation of a junction box, in a specific recessed manner, with respect to a ceiling, wherein that single set of devices may be used for such junction box installation over a range of ceilings of different thicknesses, from a maximum ceiling thickness to a minimum ceiling thickness.

It is another objective of the present invention provide a system that may permit installation of a junction box, in a specific recessed manner, with respect to a ceiling, wherein that system may be used for such junction box installation over a range of ceilings of different thicknesses, from a maximum ceiling thickness to a minimum ceiling thickness.

It is another objective of the present invention to provide devices and/or structure that ma permit a junction box to be adjusted up and down in a vertical direction, as well as adjust back and forth and side to side in a horizontal plane, with respect to a ceiling in a horizontal plane.

It is another objective of the present invention wherein the above noted adjustability may be accomplished while minimizing holes, slots, and/or breaches to the junction box.

It is yet another objective of the present invention wherein the above noted adjustability may be done quickly, easily, and efficiently.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

(FIG. 1B and FIG. 1C may be substantially opposing views.)

(FIG. 1D may be substantially orthogonal to FIG. 1B and FIG. 1C.)

(FIG. 1E may be substantially orthogonal to FIG. 1D, FIG. 1B, and FIG. 1C.)

Figure 1A:
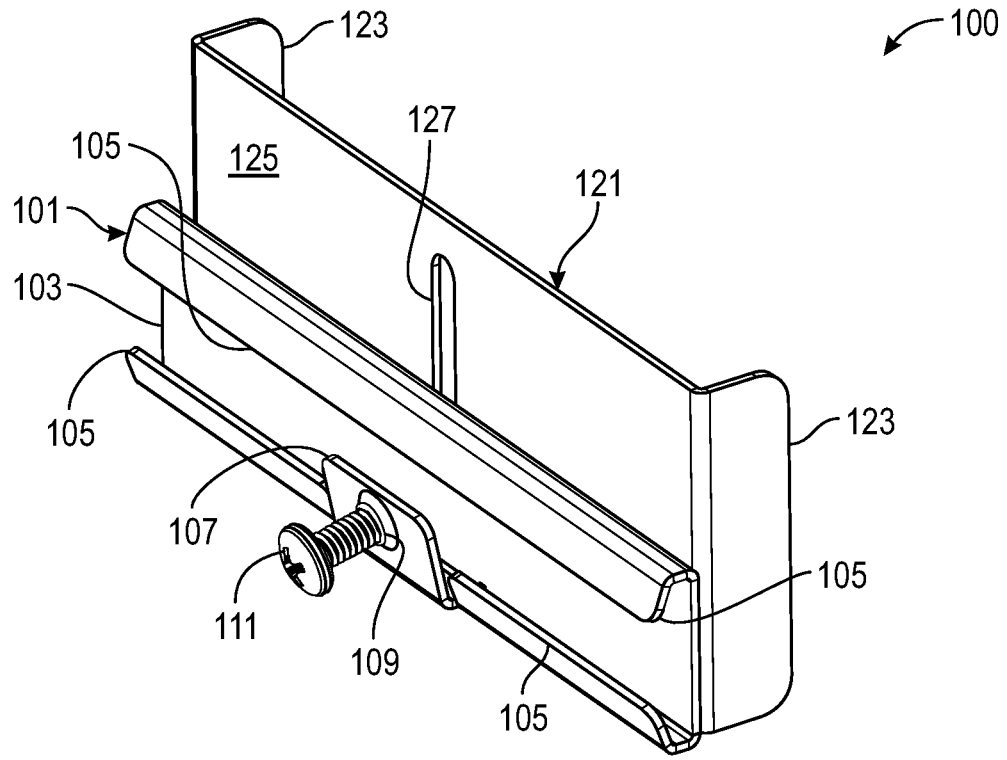
FIG. 1A may depict a perspective front view of a given hanger-bar-to-box-attachment device.

REFERENCE NUMERAL SCHEDULE 100 hanger-bar-to-box-attachment-device 100
101 hanger-bar-rail 101
103 hanger-bar-receiver-slot 103
105 blocking-flange 105
107 flange-for-locking 107
109 receiving-hole 109
111 hanger-bar-lock-screw 111
121 back-plate 121
123 end-bracket 123
125 front 125
127 slot 127
129 back 129
131 back-of-protrusion 131
133 protrusion 133
400 assembly 400
401 box 401
403 top 403
405 side 405
407 front or back 407
409 receiving-hole 409
411 height-markings 411
413 hole 413
415 hole 415
417 ground-anchor 417
421 bolt 421
423 nut 423
501 main-opening 501
503 interior 503
601 maximum-height 601
603 minimum-height 603
700 assembly 700
701 hanger-bar 701
703 elongate-bar 703
705 carriage 705
707 joist-mounting-hardware 707
801 joist 801
803 ceiling 803
805 coordinate system 805
901 maximum ceiling thickness 901
903 minimum ceiling thickness 903

DETAILED DESCRIPTION OF THE INVENTION

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

Figure 1B:
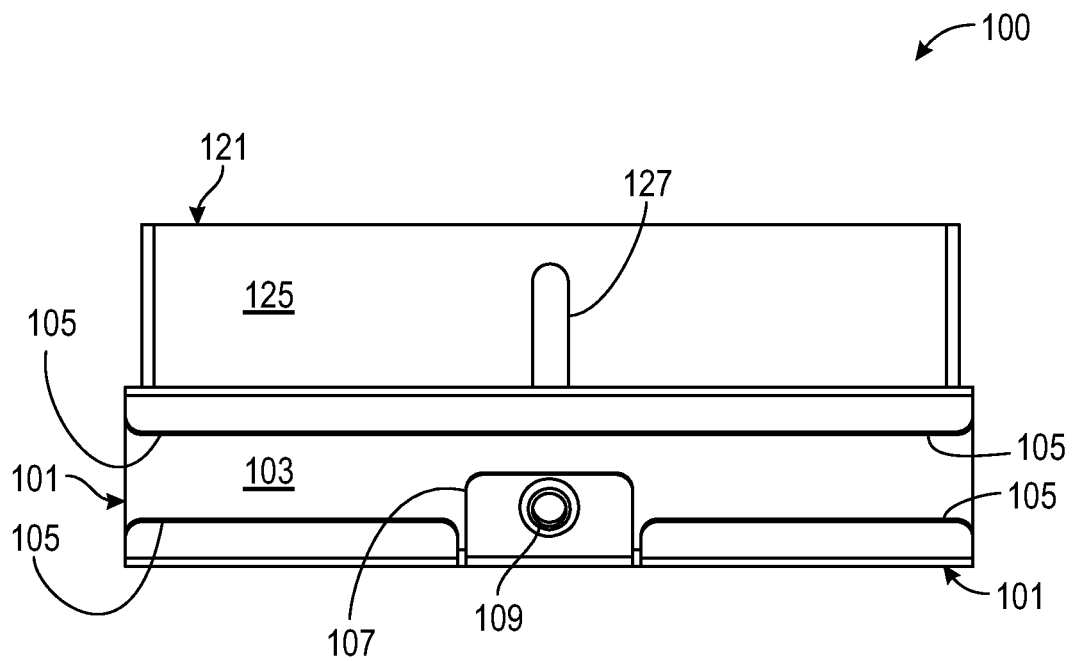
FIG. 1B may depict a front view of the given hanger-bar-to-box-attachment device.
Figure 1C:
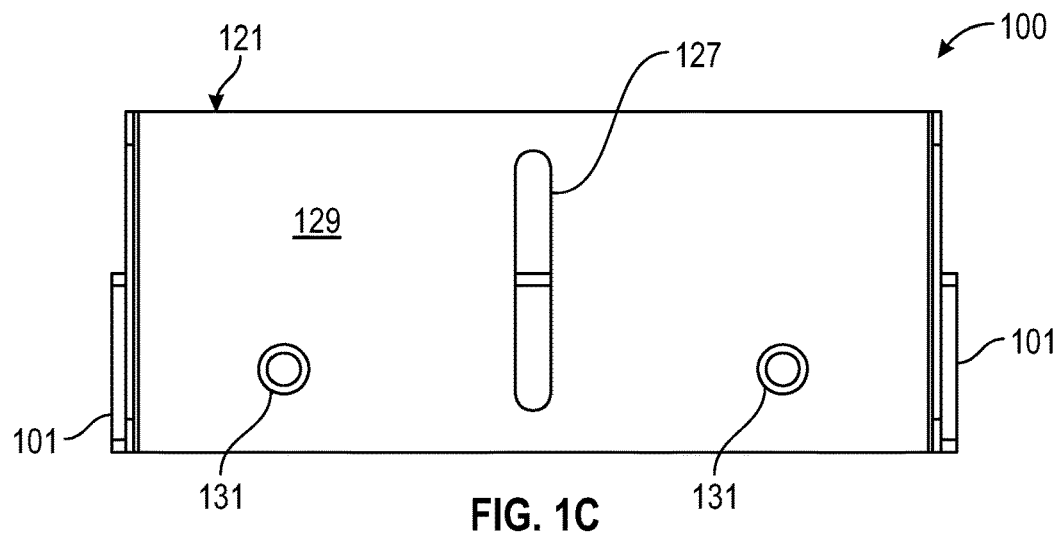
FIG. 1C may depict a back (rear) view of the given hanger-bar-to-box-attachment device.
Figure 1D:
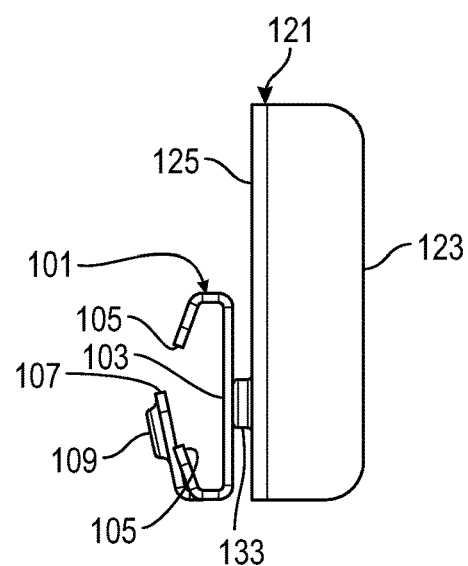
FIG. 1D may depict a side view (right and/or left) of the given hanger-bar-to-box-attachment device.
Figure 1E:
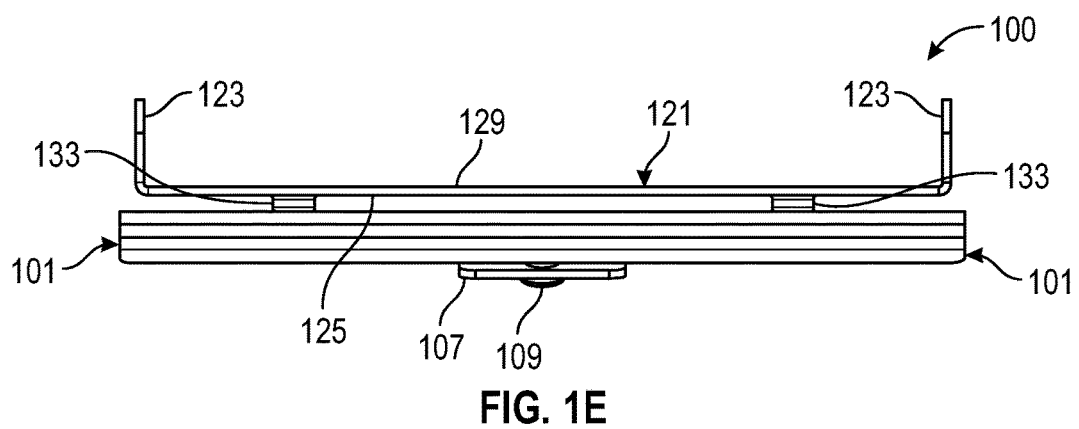
FIG. 1E may depict a top view of the given hanger-bar-to-box-attachment device.

FIG. 1A through and including FIG. 1E may depict various views of a hanger-bar-to-box-attachment-device 100. A given hanger-bar-to-box-attachment-device 100 may be used to removably attach to both a box 401 (see e.g., FIG. 4) and to a hanger-bar 701 (see e.g., FIG. 7A). Continuing discussing FIG. 1A through and including FIG. 1E, in some embodiments, a given hanger-bar-to-box-attachment-device 100 may be comprised of hanger-bar-rail 101 and back-plate 121. In some embodiments, hanger-bar-rail 101 may be a rail structure that may be configured to slidingly and removably engage and hold an elongate portion (such as elongate-bar 703 and/or carriage 705) of hanger-bar 701. In some embodiments, a portion of back-plate (e.g., slot 127) may be configured for facilitating removable and sliding attachment to box 401. In some embodiments, a back of hanger-bar-rail 101 may be attached to a front 125 of back-plate 121. In some embodiments, both hanger-bar-rail 101 and back-plate 121 may be rigid to substantially rigid members. In some embodiments, both hanger-bar-rail 101 and back-plate 121 may be substantially constructed from one or more metals.

Continuing discussing FIG. 1A through and including FIG. 1E, in some embodiments, hanger-bar-rail 101 may be an elongate member that is longer than wide. In some embodiments, hanger-bar-rail 101 may be longer than back-plate 121. In some embodiments, in a transverse-width cross-section through hanger-bar-rail 101, or in a side view of hanger-bar-rail 101, hanger-bar-rail 101 may appear approximately as a letter "C" (see e.g., FIG. 1D). In some embodiments, hanger-bar-rail 101 may be substantially formed (bent) from a piece of rectangular prism of predetermined length, that may be bent into three main regions, one hanger-bar-receiver-slot 103 and two blocking-flanges 105 that may be on either side of hanger-bar-receiver-slot 103, along a length of hanger-bar-receiver-slot 103. In some embodiments, hanger-bar-receiver-slot 103 may be an elongate member of predetermined length. In some embodiments, hanger-bar-receiver-slot 103 may be substantially straight and/or linear. In some embodiments, hanger-bar-receiver-slot 103 may be substantially flat, smooth, and/or planar. In some embodiments, running at least along a portion of a length of hanger-bar-receiver-slot 103 may be two blocking-flanges 105, such that these two blocking-flanges 105 are extending from opposing sides of hanger-bar-receiver-slot 103 along that length, such that these two blocking-flanges 105 are opposed from each other with respect to where the two blocking-flanges 105 extend from hanger-bar-receiver-slot 103. In some embodiments, the two blocking-flanges 105 may extend towards each other, but may not touch, such that along the length of hanger-bar-receiver-slot 103 there is a gap between these two blocking-flanges 105. In some embodiments, together hanger-bar-receiver-slot 103 and the two blocking-flanges 105 form a rail and/or slot configured for removably engaging portions of hanger-bars 701. In some embodiments, hanger-bar-receiver-slot 103 may be configured to slidingly receive a portion of an elongate-bar 703 portion of a given hanger-bar 701 (see e.g., FIG. 7A). In some embodiments, hanger-bar-receiver-slot 103 may be configured to slidingly receive a portion of a carriage 705 portion of the given hanger-bar 701 (see e.g., FIG. 7A). In some embodiments, the two blocking-flanges 105 may prevent the portion of elongate-bar 703 and/or the portion of carriage 705 from falling out/away from hanger-bar-receiver-slot 103.

For example, and without limiting the scope of the present invention, using the letter "C" analogy, hanger-bar-receiver-slot 103 may correspond to the stress of the letter "C" and the two blocking-flanges 105 may correspond to the barbs/stem/terminal/final of the letter "C"; and the open counter of a letter "C" may correspond to an opening to hanger-bar-receiver-slot 103 between the two blocking-flanges 105.

In some embodiments, hanger-bar-rail 101 may comprise hanger-bar-receiver-slot 103 and at least one blocking-flange 105. In some embodiments, the at least one blocking-flange 105 may be either blocking-flange 105 (i.e., top or bottom) shown in FIG. 1A through FIG. 1E. In some embodiments, both hanger-bar-receiver-slot 103 and the at least one blocking-flange 105 may be elongate, being longer than wide. In some embodiments, the at least one blocking-flange 105 may extend from a lengthwise side of hanger-bar-receiver-slot 103 and away from back-plate 121. In some embodiments, back-plate 121 may be closer to hanger-bar-receiver-slot 103 than to the at least one blocking-flange 105. In some embodiments, hanger-bar-receiver-slot 103 and the at least one blocking-flange 105 in their elongate direction may be substantially parallel with each other. In some embodiments, where the at the least one blocking-flange 105 extends from hanger-bar-receiver-slot 103 a support is formed that supports the elongate portion of hanger-bar 701 when the elongate portion of the hanger-bar 701 may be within the hanger-bar-rail 101. For example, and without limiting the scope of the present invention, this support would be the inside bottom or the inside top of hanger-bar-rail 101 in FIG. 1D.

In some embodiments, a given blocking-flange 105 may help to prevent the elongate portion of hanger-bar 701 from becoming unintentionally disengaged from hanger-bar-rail 101 by being a physical barrier to the elongate portion of hanger-bar 701, when the elongate portion of hanger-bar 701 may be within hanger-bar-rail 101.

In some embodiments, hanger-bar-rail 101 may comprise a second blocking-flange 105 that is also elongate, being longer than wide. In some embodiments, the second blocking-flange 105 may extend from an opposite lengthwise side of hanger-bar-receiver-slot 103 (i.e., opposite from where the first or the at least one 105 is extending from). In some embodiments, back-plate 121 may be closer to hanger-bar-receiver-slot 103 than to the second blocking-flange 105. In some embodiments, hanger-bar-receiver-slot 103 and the second blocking-flange 105 in their elongate direction may be substantially parallel with each other. In some embodiments, the at least one blocking-flange 105 and the second blocking-flange 105 may extend partially towards each other without touching each other, such that there is a gap between where the at least one blocking-flange 105 ends and where the second blocking-flange 105 ends. In some embodiments, the at least one blocking-flange 105 and the second blocking-flange 105 may help to prevent the elongate portion of the hanger-bar 701 from becoming unintentionally disengaged from the hanger-bar-rail 701.

Continuing discussing FIG. 1A through and including FIG. 1E, in some embodiments, a given blocking-flange 105 may not run continuously along an entire length of hanger-bar-receiver-slot 103. In some embodiments, a given blocking-flange 105 may have a break in that given blocking-flange 105 along a length of hanger-bar-receiver-slot 103. In some embodiments, at a break in a given blocking-flange 105, may be a flange-for-locking 107. In some embodiments, flange-for-locking 107 may be a flange that extends away from a side of hanger-bar-receiver-slot 103. In some embodiments, flange-for-locking 107 may be rigid to substantially rigid. In some embodiments, flange-for-locking 107 may be substantially constructed from one or more metals. In some embodiments, flange-for-locking 107 may be located substantially at a middle of hanger-bar-receiver-slot 103, with respect to a fixed/predetermined length of hanger-bar-receiver-slot 103. In some embodiments, flange-for-locking 107 may have at least one through hole, receiving-hole 109. In some embodiments, receiving-hole 109 may be configured to removably receive a screw or bolt, hanger-bar-lock-screw 111. In some embodiments, receiving-hole 109 may be threaded (e.g., female threaded) for receiving a threaded screw or bolt, such as, hanger-bar-lock-screw 111. In some embodiments, hanger-bar-lock-screw 111 may be a screw or a bolt. In some embodiments, hanger-bar-lock-screw 111 may be a threaded screw or a threaded bolt. In some embodiments, hanger-bar-lock-screw 111 may be inserted into receiving-hole 109 and used to apply force/friction against a portion of a hanger-bar 701 removably residing/housed within hanger-bar-receiver-slot 103 and the two blocking-flanges 105 (see e.g., FIG. 7A, FIG. 7B, and FIG. 8). In this way, a position of hanger-bar-rail 101 may slid along the portion of hanger-bar 701 and then tightened to remain in a desired location along that portion of hanger-bar 701. Thus, flange-for-locking 107, receiving-hole 109, and hanger-bar-lock-screw 111 may be used to lock a desired position between hanger-bar-rail 101 and the portion of the hanger-bar 701 that may be within hanger-bar-rail 101.

In some embodiments, hanger-bar-rail 101 may comprise flange-for-locking 107 that may be a flange that extends from a side of hanger-bar-receiver-slot 103. In some embodiments, flange-for-locking 107 may comprise receiving-hole 109 that may pass entirely through flange-for-locking 107. In some embodiments, receiving-hole 109 may be configured to receive at least a portion of a hanger-bar-lock-screw 111, that may be a screw, a bolt, or the like. In some embodiments, when the elongate portion of hanger-bar 701 may be engaged and held by hanger-bar-rail 101, tightening of hanger-bar-lock-screw 111 against the elongate portion of the hanger-bar 701 may stop sliding translation of the elongate portion of the hanger-bar 701 with respect to the hanger-bar-rail 101. This may be how a desired position is locked/secured with respect to a given hanger-bar-to-box-attachment-device 100 and its associated hanger-bar 701.

Continuing discussing FIG. 1A through and including FIG. 1E, in some embodiments, a given back-plate 121 may be approximately "C" letter shaped when viewed from a top or a bottom.

Figure 3:
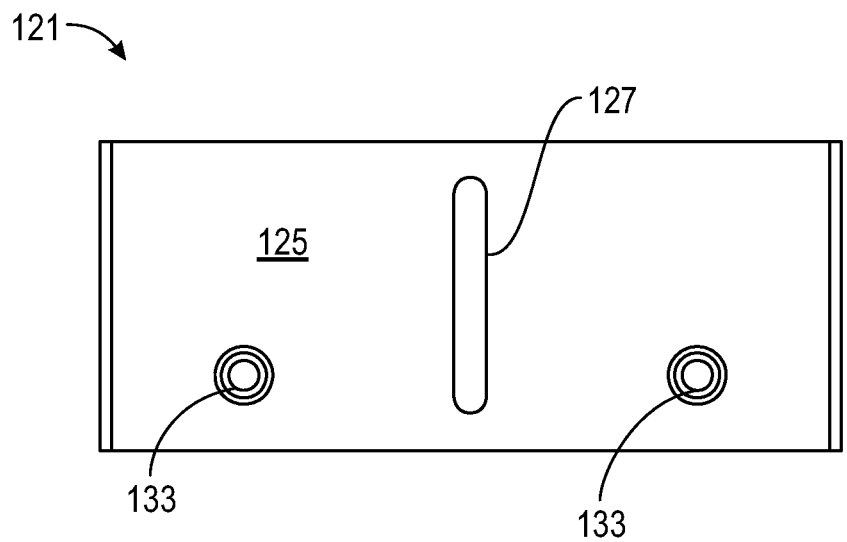
FIG. 3 may depict a front view of the back-plate.

In some embodiments, a main-portion of back-plate 121 may be the main portions of back-plate 121 shown in FIG. 1C (not including the end-brackets 123) or the main-portion of back-plate 121 may be the main portions of back-plate 121 shown in FIG. 3. In some embodiments, the main-portion of back-plate 121 may be a substantially rectangular prism member, that may be substantially flat, planar, smooth, combinations thereof, and/or the like. In some embodiments, the main-portion of back-plate 121 may be substantially parallel with the length of hanger-bar-rail 101.

In some embodiments, on opposing ends of this main-portion may be two end-brackets 123. In some embodiments, a given back-plate 121 may comprise two opposing end-brackets 123. In some embodiments, these two opposing end-brackets 123 may be configured to removably engage opposing sides 405 of a given box 401 (see e.g., FIG. 4). Thus, an overall length of back-plate 121 may be just bigger than a width of box 401, so that the two opposing end-brackets 123 may removably engage opposing sides 405 of a given box 401. In some embodiments, the main-portion of back-plate 121 may have front 125. In some embodiments, front 125 may face hanger-bar-rail 101 (see e.g., FIG. 1A or FIG. 1B).

In some embodiments, back-plate 121 may comprise two oppositely disposed end-brackets 123. In some embodiments, each such end-bracket 123 may extend (substantially) orthogonally away from the main-portion of back-plate 121 at each opposite lengthwise end of the main-portion of back-plate 121. In some embodiments, each such end-bracket 123 also may extend away from hanger-bar-rail 101 of that hanger-bar-to-box-attachment-device 100. In some embodiments, between the two oppositely disposed end-brackets 123 a portion of box 401 may be receivable (see e.g., FIG. 4).

In some embodiments, back-plate 121 may comprise slot 127 that may pass entirely through the main-portion of back-plate 121. In some embodiments, the main-portion of back-plate 121 may comprise at least one through slot 127. In some embodiments, slot 127 may be configured to receive a portion of a bolt 421 (see e.g., FIG. 4). In some embodiments, slot 127 may be configured to receive at least a portion of bolt 421 (see e.g., FIG. 4). In some embodiments, slot 127 may be oriented substantially orthogonal with respect to a length of hanger-bar-rail 101. In some embodiments, slot 127 may run substantially vertically, with respect to ceiling 803 that assembly 400 may be in communication with (see e.g., FIG. 8). In some embodiments, slot 127 may run substantially parallel with a height of back-plate 121.

In some embodiments, with respect to a length of the main-portion of back-plate 121, slot 127 may be centrally located substantially in a middle of that length (see e.g., FIG. 1B and FIG. 1C). However, in some embodiments, there could two slots 127 located on the main-portion of back-plate 121, in which case these two slots 121 would not be located in a middle of the main-portion of back-plate 121, and there would be two receiving-holes 409 in box 401.

In some embodiments, slot 127 of back-plate 121 may be entirely bound around a periphery of slot 127, i.e., there may be back-plate 121 material all around slot 127, see e.g., FIG. 1C. Whereas, in other embodiments, a bottom portion of slot 127, i.e., towards hanger-bar-rail 101, may be unbound and open; for example, in such an embodiment, slot 127 of back-plate 121 may be at least seventy five percent entirely bound, but open at slot 127's bottom.

In some embodiments, opposing front 125 may be back (rear) 129 of back-plate 121 (see e.g., FIG. 1C). In some embodiments, front 125 and back 129 may be on opposite sides of main-portion of back-plate 121 (compare FIG. 1B to FIG. 1C). In some embodiments, back 129 may be substantially flat, smooth, planar, combinations thereof, and/or the like. In some embodiments, at least of a portion of back 129 may be physically contacting front (or back) 407 of box 401, when a given hanger-bar-to-box-attachment-device 100 may be removably attached to a given box 401 (see e.g., FIG. 4). In some embodiments, back 129 may comprise back-of-protrusions 131, wherein protrusions 133 may extend substantially orthogonally away from front 125. See e.g., FIG. 1C for back-of-protrusions 131; and see FIG. 1D, FIG. 1E, and FIG. 3 for protrusions 133. In some embodiments, front 125 may have at least one protrusion 133. In some embodiments, front 125 may have two different protrusions 133. In some embodiments, for each protrusion 133 there may be one corresponding back-of-protrusion 131. In some embodiments, protrusions 133 may facilitate punch/spot welding of front 125 of back-plate 121 to back of hanger-bar-rail 101 to form a given hanger-bar-to-box-attachment-device 100 (see e.g., FIG. 1A through and including FIG. 1E and see FIG. 2).

In some embodiments, a given hanger-bar-to-box-attachment-device 100 may comprise a hanger-bar-receiver-slot 103, two blocking-flanges 105, one flange-for-locking 107, one receiving-hole 109, one hanger-bar-lock-screw 111, two end-brackets 123, a front 125, a slot 127, a back 129, and at least one protrusion 133.

Figure 2:
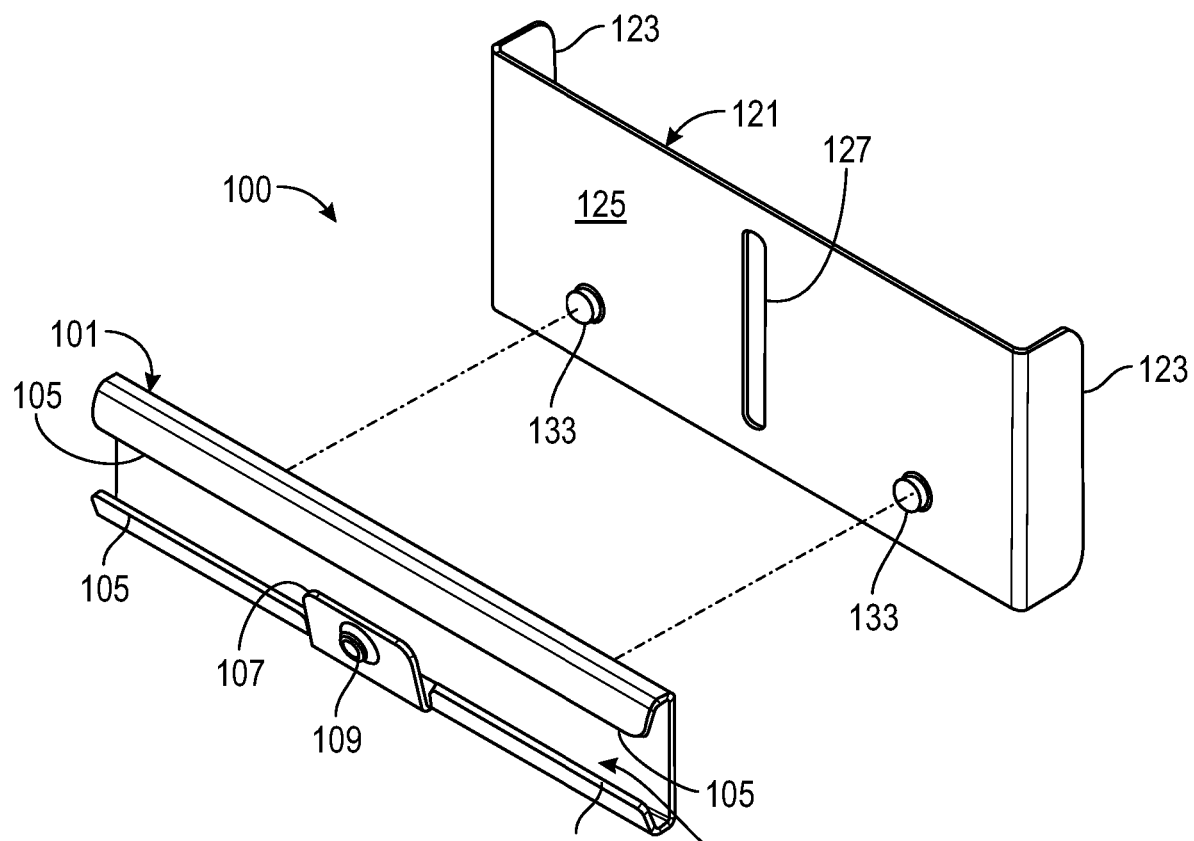
FIG. 2 may depict an exploded perspective front view of the given hanger-bar-to-box-attachment device showing a hanger-bar-rail separated from a back-plate.

FIG. 2 may depict an exploded perspective view showing hanger-bar-rail 101 exploded away from back-plate 121. FIG. 2 may show how protrusion(s) 133 may be used to attach back-plate 121 to hanger-bar-rail 101. FIG. 2 may show how protrusion(s) 133 may be used in welding back-plate 121 to hanger-bar-rail 101.

FIG. 3 may depict a front view of back-plate 121, without the hanger-bar-rail 101. FIG. 3 may show front 125 of back-plate 121, showing the at least one protrusion 133 that may extend away from front 125. Once hanger-bar-rail 101 is attached to back-plate 121, protrusion(s) 133 may not be visible from a front view, as shown by FIG. 1B.

Figure 4:
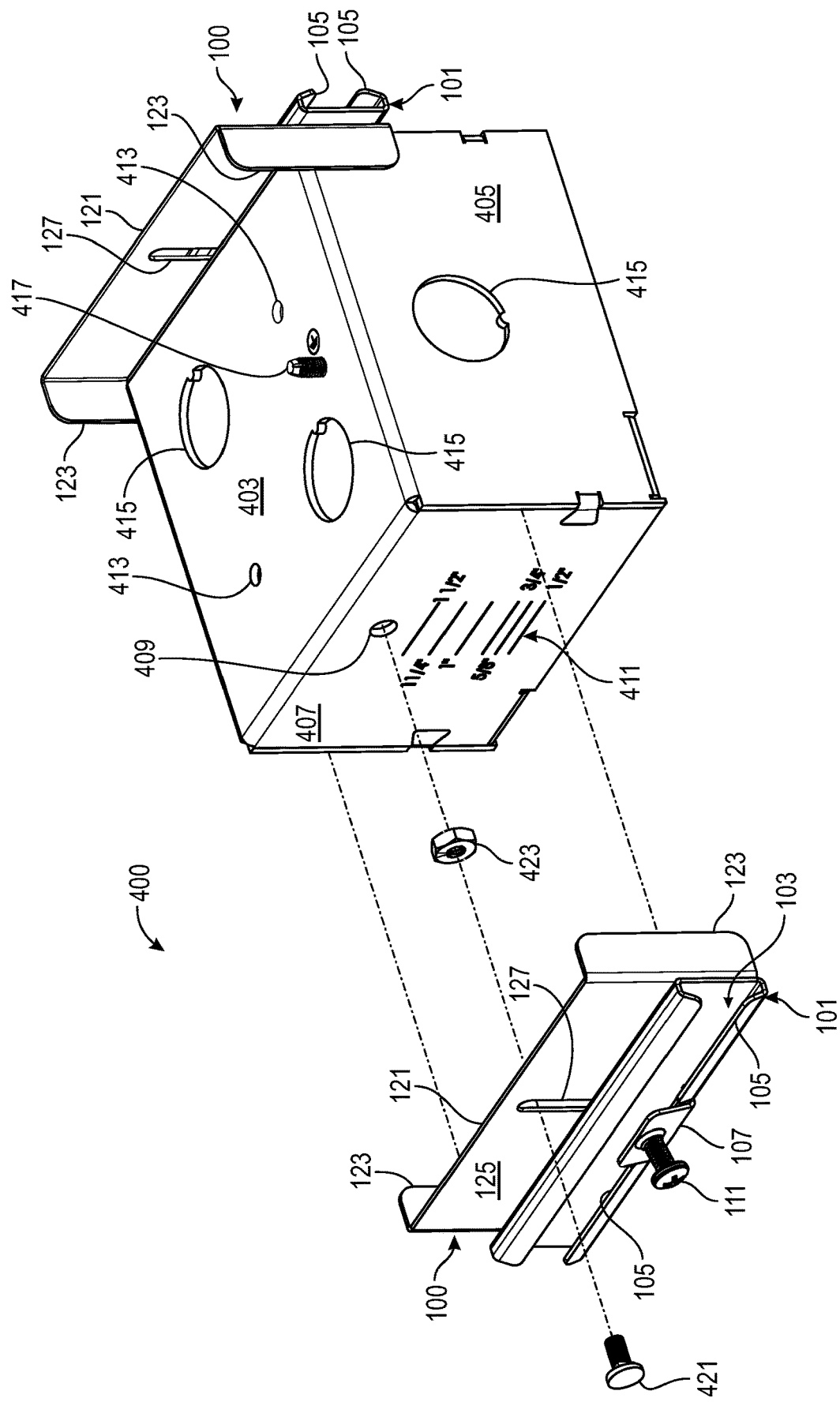
FIG. 4 may depict a partial exploded front perspective view of a box (e.g., a junction box) with respect to a hanger-bar-to-box-attachment device.

FIG. 4 may depict a partial exploded view of an assembly 400 comprising a box 401 and two hanger-bar-to-box-attachment-devices 100. In FIG. 4 one hanger-bar-to-box-attachment-device 100 is shown attached to box 401, while the other hanger-bar-to-box-attachment-device 100 is shown exploded away from box 401. In some embodiments, assembly 400 may comprise at least one box 401, at least two opposing hanger-bar-to-box-attachment-devices 100 removably and slidingly attached to the at least one box 401, and a least two bolts 421 to facilitate the removable and sliding attachment between the least one box 401 and the two opposing hanger-bar-to-box-attachment-devices 100.

Continuing discussing FIG. 4, in some embodiments, box 401 may be junction box. In some embodiments, box 401 may be an electrical junction box. In some embodiments, box 401 may be a lighting junction box. In some embodiments, box 401 may be rated for electrical use by an evaluating organization/agency. In some embodiments, box 401 may be rated and/or configured to minimize risk of electrical fires. In some embodiments, a number of holes, slots, and/or breaches in box 401 may be minimized. In some embodiments, during normal intended use, holes and/or breaches in box 401 may be substantially filled (e.g., with portions of bolts, screws, wires, and/or conduits passing through such holes and/or breaches). In some embodiments, in use, box 401 may be intended to mounted in a recessed relationship (configuration) with respect to a ceiling 803 (see e.g., FIG. 9A, FIG. 9B, and FIG. 8). In some embodiments, box 401 may be substantially enclosed on all but one side that open side being a main-opening 501 to box 401. In some embodiments, box 401 may have six sides, with one side being substantially open (that being main-opening 501 to box 401). In some embodiments, the substantially open side may be deemed main-opening 501, see e.g., FIG. 5 or FIG. 7B. In some embodiments, box 401 may have a top 403, two opposing sides 405, a front 407, a back 407, and main-opening 501. In some embodiments, top 403 and main-opening 501 may be substantially opposing each other and substantially parallel with each other. In some embodiments, the two sides 405 may be substantially opposing each other and substantially parallel with each other. In some embodiments, front 407 and back 407 may be substantially opposing each other and substantially parallel with each other. In some embodiments, top 403 may be separated from main-opening 501 by sides 405, front 407 and back 407. In some embodiments, sides 405 may be separated from each other by front 407, top 403, and back 407. In some embodiments, front 407 may be separated from back 407 by sides 405 and top 403. In some embodiments, top 403 may be substantially orthogonal with respect to sides 405, front 407, and back 407. In some embodiments, a given side 405 may be substantially orthogonal with respect to top 403, front 407, and back 407. In some embodiments, front 407 (or back 407) may be substantially orthogonal with respect to sides 405 and top 403. In some embodiments, top 403 may be attached to both sides 405, to front 407, and to back 407. In some embodiments, a given side 405 may be attached to top 403, front 407, and back 407. In some embodiments, front 407 may be attached to top 403, and the two different opposing sides 405. In some embodiments, back 407 may be attached to top 403, and the two different opposing sides 405. In some embodiments, aside from main-opening 501, each side of box 401 may be substantially a rectangular prism; and main-opening 501 may be an opening of a shape that may be substantially a rectangular prism.

In some embodiments, box 401 may comprise top 403, two oppositely disposed sides 405, front 407, rear 407, and a substantially open bottom (main-opening 501). In some embodiments, the substantially open bottom may be disposed opposite of top 403. In some embodiments, the two oppositely disposed sides 405, front 407, and rear 407 may extend substantially orthogonally away from top 403 towards the substantially open bottom (main-opening 501). See e.g., FIG. 4 and FIG. 5.

Continuing discussing FIG. 4, in some embodiments, front 407 (and back 407) may comprise at least one through hole, a receiving-hole 409. In some embodiments, box 401 may comprise two opposing receiving-holes 409. In some embodiments, a given box 401 may comprise two receiving-holes 409 that may be placed/located on opposing sides of box 401. In some embodiments, receiving-hole 409 may be configured to at least a portion of receive bolt 421. In some embodiments, bolt 421 may be used to attach back-plate 121 to front 407 (and/or to back 407), by a portion of bolt 421 passing through slot 127 of back-plate 121 and a portion of bolt 421 then passing through and/or into receiving-hole 409 of front/back 407. In some embodiments, when hanger-bar-rail 101 may be removably attached to box 401, a nut 423 may be disposed between back-plate 121 and front/back 407, with a portion of bolt 421 passing through this nut 423. In some embodiments, receiving-hole 409 may be female threaded. In some embodiments, nut 423 may be female threaded. In some embodiments, bolt 421 may be male threaded. In some embodiments, bolt 421 may be a screw. Note, because of an elongate and/or vertical nature of slot 127, hanger-bar-rail 101 may be removably attached to box 401 at different heights of box 401. That is, hanger-bar-rail 101 and box 401 may be adjusted with respect to each other in a vertical/height/up-down direction. In turn, this means box 401 may be set at various and predetermined heights/distances with respect to ceiling 803, such that box 401 may be recessed from ceiling 803 at a particular desired and predetermined height/distance (see e.g., FIG. 9A and FIG. 9B).

In some embodiments, box 401 on an exterior surface may comprise receiving-hole 409 that may be configured to removably receive a distal portion of bolt 421. So, during normal use, receiving-hole 409 may largely be filled with portions of bolt 421. In some embodiments, when receiving-hole 409 has received the distal portion of bolt 421 and the at least the portion of bolt 421 may be passing through slot 127, a given hanger-bar-to-box-attachment-device 100 may be removably attached to box 401 and a position of box 401 may be adjustable along the length of slot 127 (or at least along a portion of the length of slot 127). In some embodiments, bolt 421, slot 127 in the main-portion of back-plate 121, and receiving-hole 409 in box 401 may permit box 401 to be slidingly adjustable and tightened along the length of slot 127 (or at least along a portion of the length of slot 127).

Continuing discussing FIG. 4, in some embodiments, box 401 may comprise at least one height-markings 411. In some embodiments, height-markings 411 may be located on an exterior of box 401. In some embodiments, height-markings 411 may be located on an exterior side of box 401. In some embodiments, height-markings 411 may be located on an exterior of front 407 of box 401. In some embodiments, height-markings 411 may be located on an exterior of front 407 and rear (back) 407 of box 401. In some embodiments, height-markings 411 may be located on an exterior side of box 401, but not on top 403 of box 401. "Height-markings 111" may also be referred to herein as a set of height-markings 111. In some embodiments, each height-marking selected from the set of height-markings 111 may correspond to a particular and predetermined thickness of ceiling 803. In some embodiments, height-markings 411 may be visual indicia located on an exterior side of box 401. In some embodiments, height-markings 411 may be markings located on an exterior side of box 401. In some embodiments, height-markings 411 may be markings displayed on an exterior side of box 401. In some embodiments, height-markings 411 may be markings located on an exterior side of box 401 that may be placed by one or more of: printing, etching, molding/casting, drawing, painting, adhesive (sticker), combinations thereof, and/or the like. In some embodiments, height-markings 411 may comprise a plurality of marks, wherein each mark selected from the plurality of marks corresponds to a different height/distance. In some embodiments, height-markings 411 may comprise a plurality of marks, wherein each mark selected from the plurality of marks corresponds to a different ceiling thickness. In some embodiments, height-markings 411 may comprise a plurality of marks, wherein each mark selected from the plurality of marks may be a horizontal line (bar). In some embodiments, height-markings 411 may comprise a plurality of marks, wherein each mark selected from the plurality of marks may be a horizontal line (bar), some of which may include a number and unit of measure, indicating a height, distance, and/or ceiling thickness. In some embodiments, height-markings 411 may comprise a plurality of marks, wherein each mark selected from the plurality of marks may be a horizontal line (bar), which may include a number and unit of measure, as follows: half an inch, five eights of an inch, three quarters of an inch, one inch, one and one quarter inches, and one and one half inches. In some embodiments, each mark (e.g., each horizontal line/bar) of height-markings 411 may be predetermined. In some embodiments, each mark (e.g., each horizontal line/bar) of height-markings 411 may be predetermined and set to correspond to a particular ceiling thickness that may be common in industry. In some embodiments, height-markings 411 may be displayed in a predetermined unit of measure, such as, but not limited to, inches, centimeters (cm), combinations thereof, and/or the like. See also FIG. 6A for height-markings 411. In some embodiments, a given box 401 may comprise a two height-markings 411 that may be located opposed to each other on opposing sides of box 401. In some embodiments, front 407 may comprise height-markings 411; and back 407 may comprise a different height-markings 411.

In some embodiments, the length of slot 127 (or at least a portion of the length of slot 127) may be sized to correspond to a height of the set of height-markings 411, such that when the given hanger-bar-to-box-attachment-device 100 is attached to box 401, the height-marking 411 selected from the set of height-markings 411 that is just covered by a bottom of that hanger-bar-to-box-attachment-device 100 indicates the particular and predetermined thickness of ceiling 803 that box 401 should be installed with to achieve the recessed configuration of box 401.

Continuing discussing FIG. 4, in some embodiments, a given side of box 401 may comprise at least one through hole 413. In some embodiments, a given hole 413 may be configured to receive electrical wiring and/or configured to receive a bolt/screw.

Continuing discussing FIG. 4, in some embodiments, a given side of box 401 may comprise at least one through hole 415. In some embodiments, a given hole 415 may be configured to receive electrical wiring, such as, but not limited to conduit and/or the like. In some embodiments, hole(s) 415 may be larger than hole(s) 413. In some embodiments, a given hole 415 may be initially sealed and/or covered with a blank, and if use of that hole 415 may be desired, that blank may then be removed. In some embodiments, hole(s) 413 and/or hole(s) 415 may be fixed, predetermined, and sized according to industry standards.

Continuing discussing FIG. 4, in some embodiments, a given side of box 401 may comprise at least one ground-anchor, such as, but not limited to, a ground screw (with cup washer).

Figure 5:
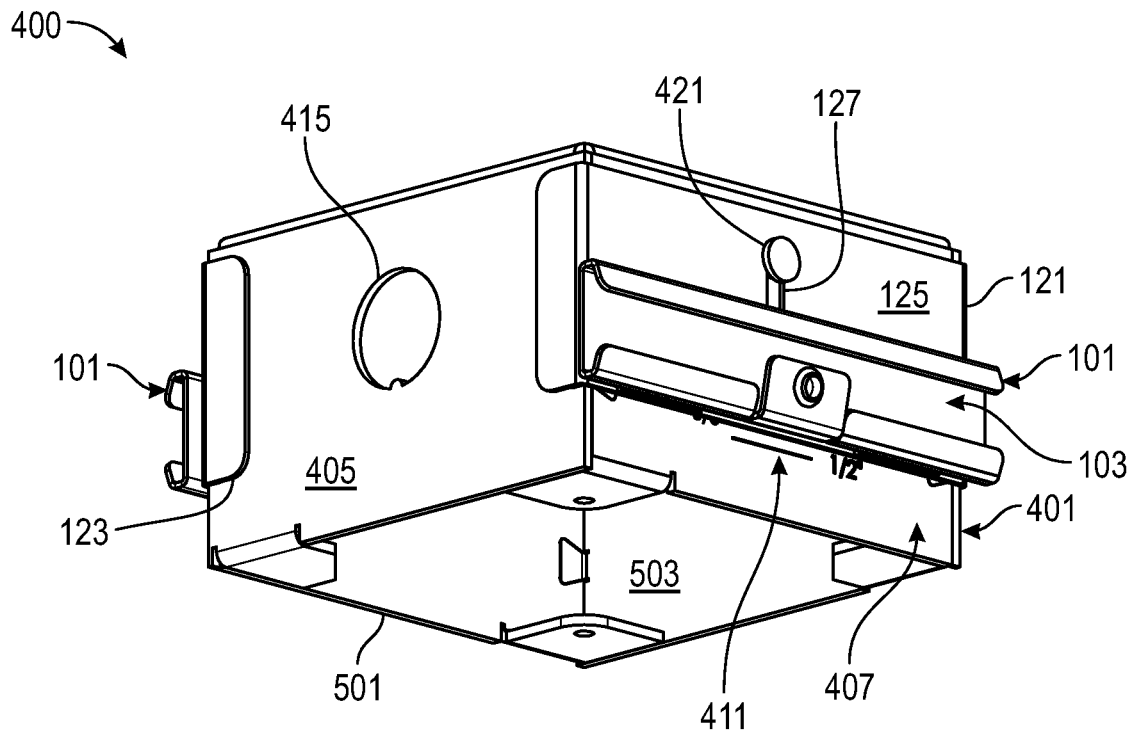
FIG. 5 may depict a bottom perspective view of the box with two opposing hanger-bar-to-box-attachment devices attached to the box.

FIG. 5 may depict a bottom perspective view of assembly 400 showing main-opening 501 of box 401. Additionally, a portion of an interior 503 of box 401 may be seen in FIG. 5.

Figure 6A:
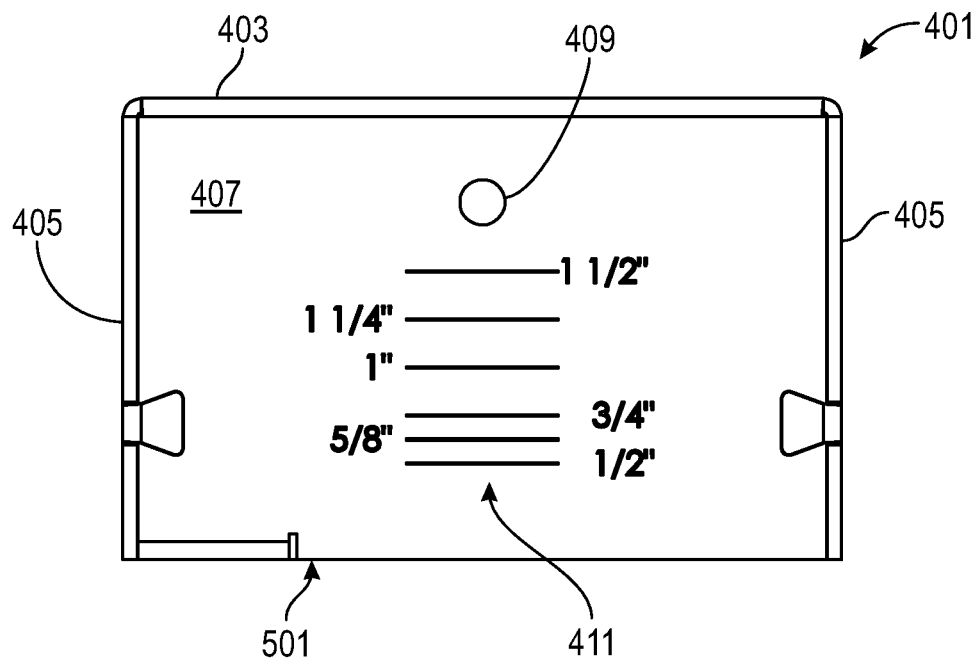
FIG. 6A may a front (or back/rear) view of the box, without showing the hanger-bar-to-box-attachment devices.

FIG. 6A may show a front (or a back/rear) view of a given box 401 without any hanger-bar-to-box-attachment-devices 100, so that height-markings 411 and receiving-hole 409 may be seen clearly. In some embodiments, receiving-hole 409 may be disposed above height-markings 411, such that receiving-hole 409 may be located closer to top 403 and further away from main-opening 501 compared to height-markings 411. In some embodiments, height-markings 411 may be disposed below receiving-hole 409, such that height-markings 411 may be located closer to main-opening 501 and further away from top 403 as compared to receiving-hole 409. In some embodiments, receiving-hole 409 and height-markings 411 may be located vertically on front/back 407 with respect to each other. In some embodiments, with respect to a width of front/back 407, receiving-hole 409 and/or height-markings 411 may be located substantially in a middle of front/back 407.

Figure 6B:
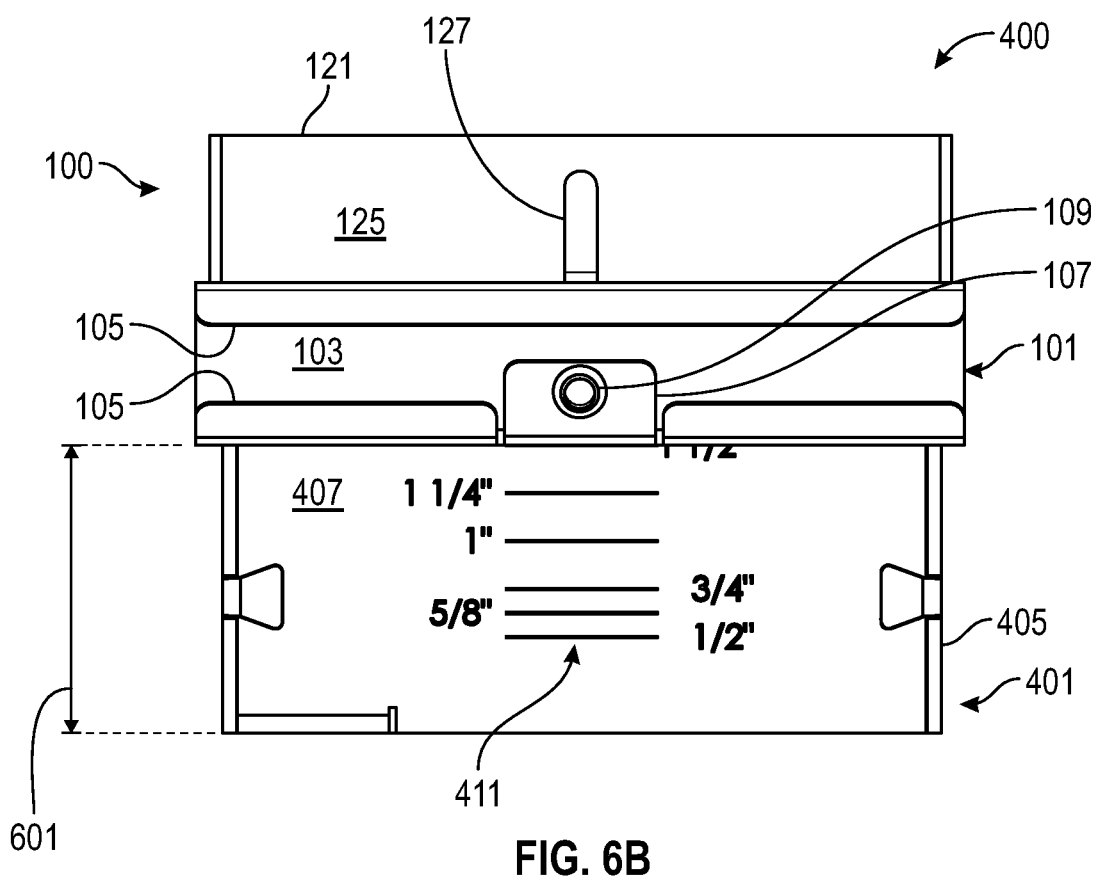
FIG. 6B may depict a front view of the box with a hanger-bar-to-box-attachment device attached to the box, wherein the box is in a maximum-height setting (configuration) with respect to the hanger-bar-to-box-attachment device.
Figure 6C:
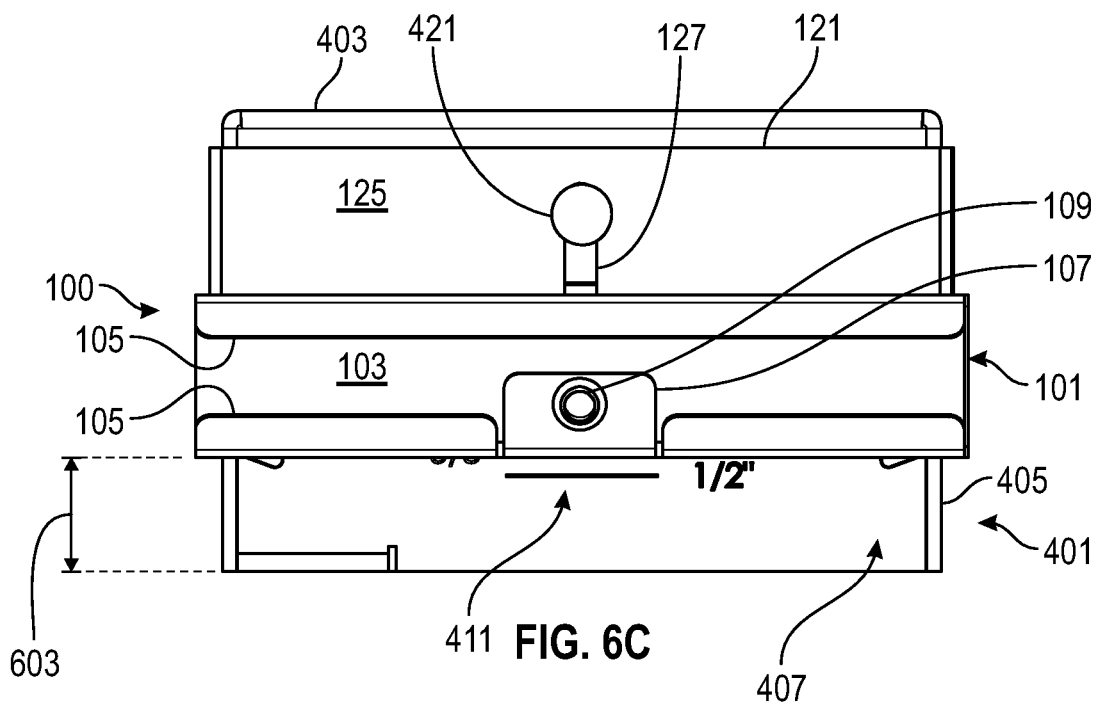
FIG. 6C may depict a front view of the box with a hanger-bar-to-box-attachment device attached to the box, wherein the box is in a minimum-height setting (configuration) with respect to the hanger-bar-to-box-attachment device.

FIG. 6B may show a same front (or back/rear) view of box 401, but now with the two hanger-bar-to-box-attachment-devices 100 attached to box 401 in a maximum-height 601 configuration. FIG. 6C may show the same front (or back/rear) view of box 401, but with the two hanger-bar-to-box-attachment-devices 100 attached to box 401 in a minimum-height 603 configuration.

As noted above, slot 127 of back-plate 121 allows a vertical/height position of hanger-bar-to-box-attachment-device 100 to be adjusted with respect to box 401. In some embodiments, when 100 may be attached to box 401 (e.g., by a portion of bolt 421 passing through slot 127 and into receiving-hole 409), a bottom edge of hanger-bar-rail 101 may be used to read a setting of height-markings 411. For example, and without limiting the scope of the present invention, in FIG. 6B the bottom edge of hanger-bar-rail 101 may be at the highest (top most) marking of height-marking 411, which may correspond to maximum-height 601. In some embodiments, in application, FIG. 6B may then correspond to FIG. 9A, wherein ceiling 803 may have a maximum ceiling thickness 901.

Whereas, in contrast, in FIG. 6C the bottom edge of hanger-bar-rail 101 may be at the lowest (bottom most) (or may be approaching that lowest/bottom most) marking of height-marking 411, which may correspond to minimum-height 603. In some embodiments, in application, FIG. 6C may then correspond to FIG. 9B, wherein ceiling 803 may have a minimum ceiling thickness 903.

For example, and without limiting the scope of the present invention, presently (currently) in the U.S., a majority of ceilings 803 have a given fixed and predetermined thickness that are common such as about: one half inch, five eights of an inch, three quarters of an inch, one inch, one and one quarter inches, and one and one half inches. Thus, slot 127 and height-marking 411 permit a given box 401 to be installed in a particular recessed position with respect to a variety of different ceilings 803 of particular and/or common thicknesses. In some embodiments, hanger-bar-to-box-attachment-device 100 and box 401 (e.g., assembly 400) may be manufactured to specifically accommodate other dimensions (in which height-marking 411 may be different that what is shown in the drawing figures).

In some embodiments, hanger-bar-to-box-attachment-device 100 and box 401 (e.g., assembly 400) may be manufactured to specifically accommodate a ceiling 803 of a particular thickness, so that box 401 may be fixedly installed and recessed in a particular and desired location with respect to that ceiling 803.

In some embodiments, box 401 may be vertically adjustable, with respect to a given hanger-bar-to-box-attachment-device 100, between maximum-height 601 and minimum-height 603.

Figure 7A:
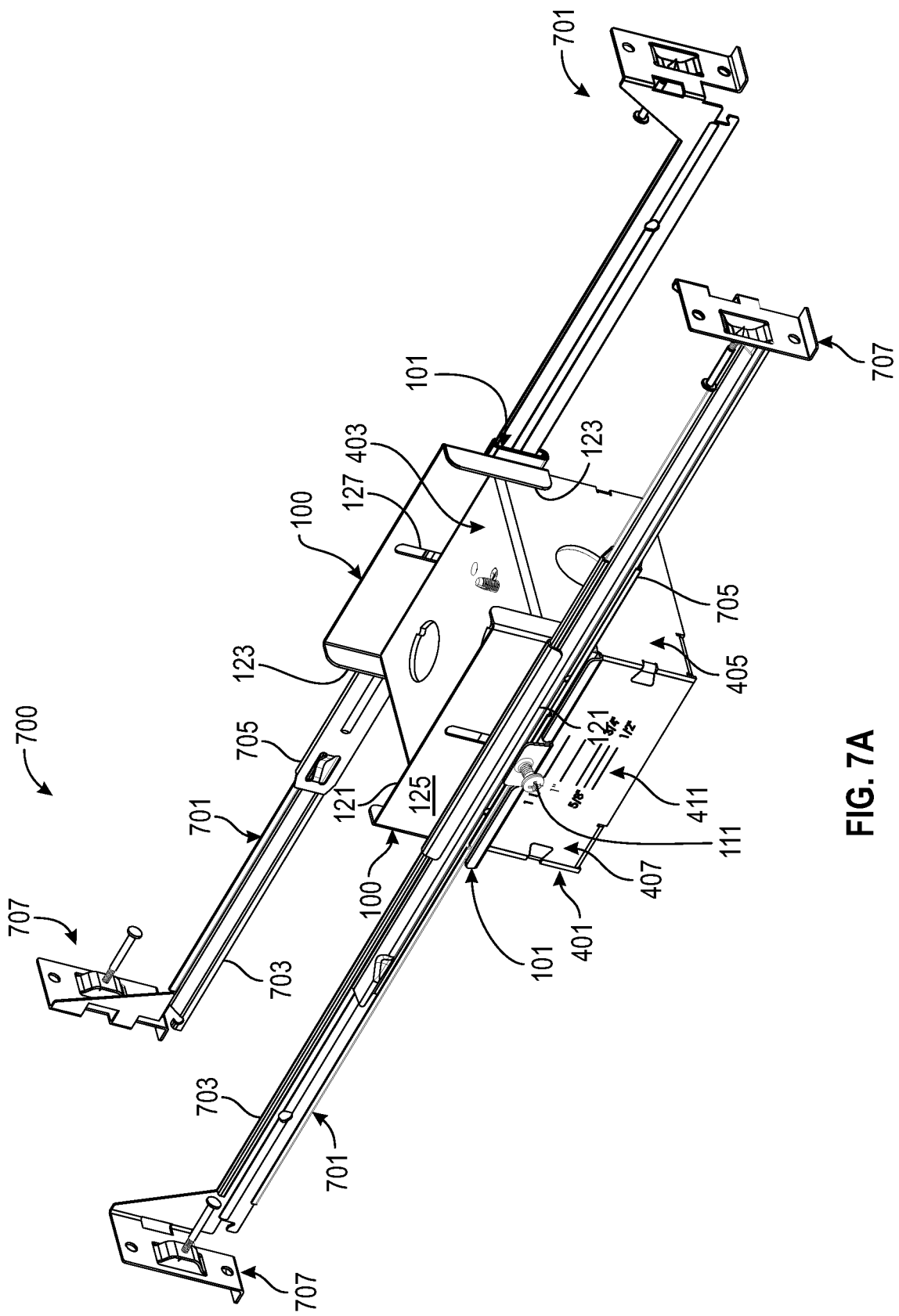
FIG. 7A may depict a top front (or rear) perspective view of the box with two opposing hanger-bar-to-box-attachment devices attached to the box; and with two opposing and substantially parallel hanger-bars attached to hanger-bar-to-box-attachment devices.
Figure 7B:
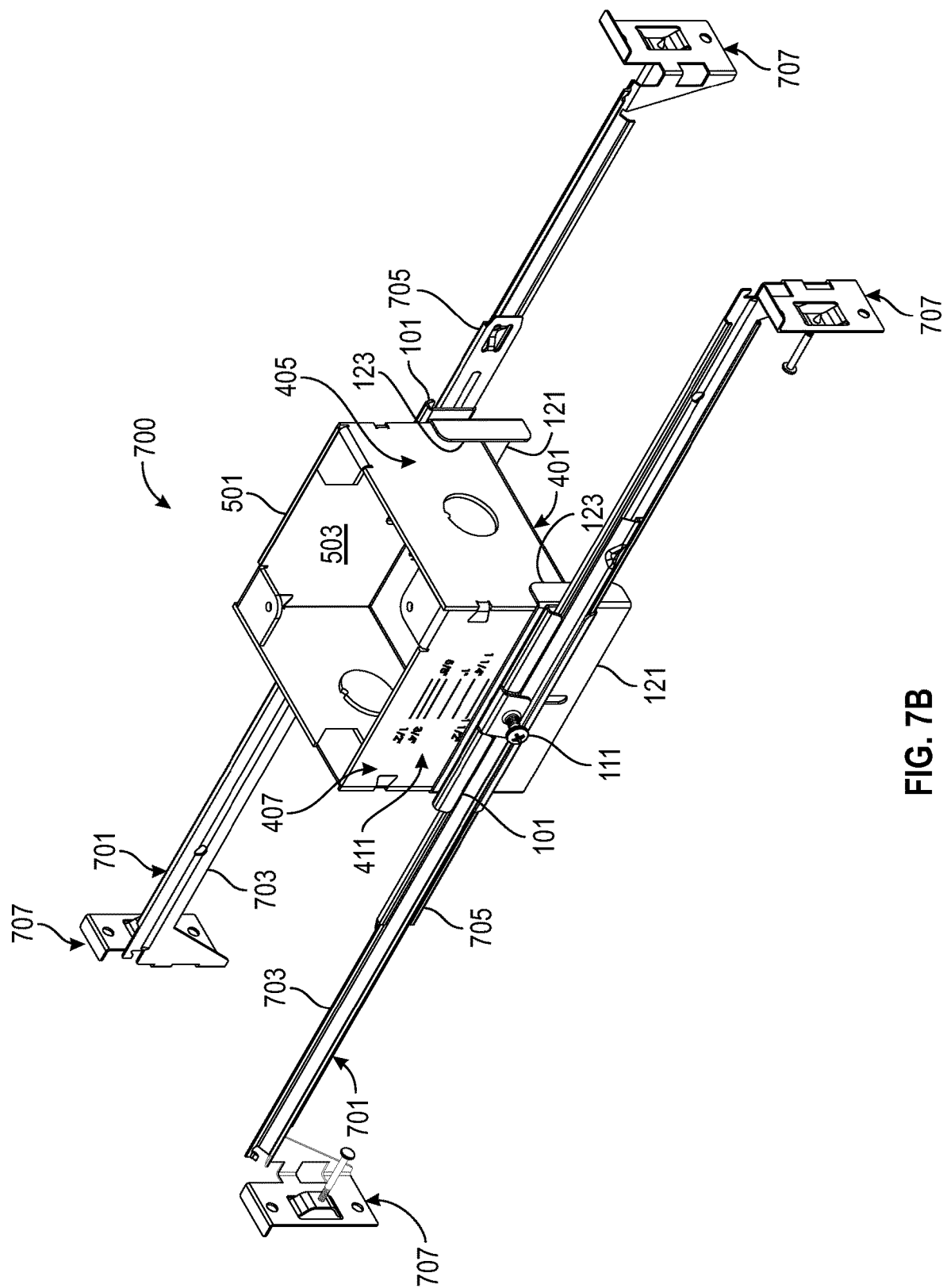
FIG. 7B may depict a bottom front (or rear) perspective view of the box with two opposing hanger-bar-to-box-attachment devices attached to the box; and with two opposing and substantially parallel hanger-bars attached to hanger-bar-to-box-attachment devices.

FIG. 7A may show as assembly 700 from a top perspective view. FIG. 7B may show assembly 700 from a bottom perspective view. In some embodiments, assembly 700 may comprise assembly 400 (box 401 and two hanger-bar-to-box-attachment-device 100 attached to box 401) and two hanger-bars 701 that may be attached to the two hanger-bar-to-box-attachment-devices 100 of assembly 400.

Continuing discussing FIG. 7A and FIG. 7B, in some embodiments, a given hanger-bar 701 may comprise an elongate-bar 703, acting essentially as a rail. In some embodiments, a given hanger-bar 701 may comprise two elongate-bars 703, arranged substantially end to end with respect to each other, that may have a telescoping relationship with each other so that the given hanger-bar 701 may be attached to two adjacent joists 801 that may be separated from each other by various distances. In some embodiments, a given hanger-bar 701 may also comprise a carriage 705. In some embodiments, carriage 705 may slidingly engage along elongate-bar 703. In some embodiments, carriage 705 may be shorter than elongate-bar 703. In some embodiments, a portion of elongate-bar 703 and/or a portion of carriage 705 may be removably and slidingly held by hanger-bar-rail 101.

Continuing discussing FIG. 7A and FIG. 7B, in some embodiments, hanger-bar 701 may comprise two opposing terminal ends. In some embodiments, disposed on either of the terminal ends of hanger-bar 701 may be joist-mounting-hardware 707. In some embodiments, elongate-bar 703 may comprise two opposing terminal ends. In some embodiments, disposed on either of the terminal ends of elongate-bar 703 may be joist-mounting-hardware 707. In some embodiments, joist-mounting-hardware 707 may be configured for mounting a given hanger-bar 701 to a given joist 801 (see e.g., FIG. 8). Joists 801 may typically run above a given ceiling 803. Via joist-mounting-hardware 707, hanger-bars 701 may be mounted between two adjacent (and typically substantially parallel) joists 801 and above the given ceiling 803.

Continuing discussing FIG. 7A and FIG. 7B, in some embodiments, the substantially elongate portions of the two hanger-bars 701, such as the elongate-bar 703 and/or the carriage 705 of each hanger-bar 701 may be substantially parallel with each other. In some embodiments, the substantially elongate portions of the two hanger-bars 701, such as the elongate-bar 703 and/or the carriage 705 of each hanger-bar 701 may be separated from each other by at least a length of top 703 and/or a length of a side 705. In some embodiments, the substantially elongate portions of the two hanger-bars 701, such as the elongate-bar 703 and/or the carriage 705 of each hanger-bar 701 may be separated from each other by more than a length of top 703 and/or a length of a side 705, but wherein this separation distance is substantially fixed.

Figure 8:
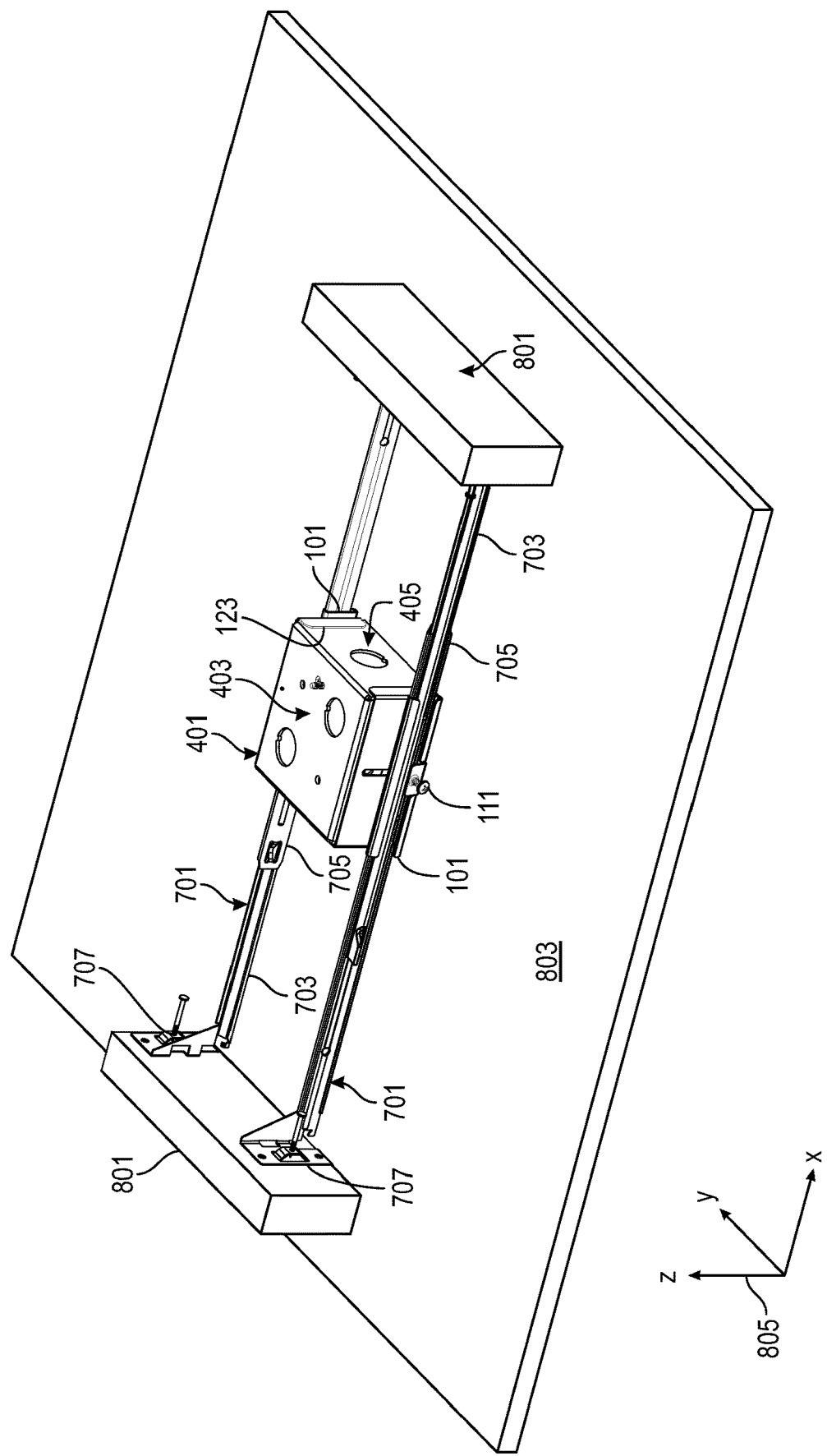
FIG. 8 may depict a top front (or rear) perspective view of the box with two opposing hanger-bar-to-box-attachment devices attached to the box; and with two opposing and substantially parallel hanger-bars attached to hanger-bar-to-box-attachment devices; and wherein these hanger-bars are attached to two joists above a ceiling.

FIG. 8 may depict assembly 700 attached to ceiling joists 801 above a portion of ceiling 803, from a top perspective view. Note FIG. 8 may also show a coordinate system 805, which may be a Cartesian coordinate system. In some embodiments, the x-axis, the y-axis, and the z-axis may be substantially orthogonal with respect to each other. In some embodiments, the x-axis and y-axis may define a substantially horizontal plane that may be substantially parallel with a plane of ceiling 803. In some embodiments, movement along the z-axis may be substantially vertical, i.e., up or down. In some embodiments, box 401 may be placed along a desired location in a y-axis direction, by varying where along joists 801 that the pair of hanger-bars 701 may be attached to. In some embodiments, box 401 may be placed along a desired location in an x-axis direction, by varying a location of box 401 along the lengths of the pair of hanger-bars 701 (e.g., a portion of each hanger-bar 701 may be slidingly and removably held by each hanger-bar-rail 101). In some embodiments, adjustability in an x-axis direction may defined (bound) by a length of the pair of hanger-bars 701. In some embodiments, adjustability in an x-axis direction may be less than the length of the pair of hanger-bars 701. In some embodiments, box 401 may be placed in z-axis direction (substantially vertical direction) by sliding each of the two hanger-bar-to-box-attachment-devices 100 up or down along their slots 127 with each bolt 421 received into and attached to its complimentary receiving-hole 409. In some embodiments, adjustability in an x-axis direction may defined (bound) by a finite vertical path of the length of slot 127 (or at least along a portion of the length of slot 127). Note, in some embodiments, the maximum and minimum markings of height-markings 411 may correspond to the length of slot 127 (or at least along a portion of the length of slot 127). Thus, assembly 400 may be moved, placed, located, and secured in both x-axis directions (e.g., via hanger-bar-rails 101 engagement with hanger-bars 701) and z-axis directions (e.g., via sliding hanger-bar-to-box-attachment-devices 100 up or down along slots 127 with bolts 421 attached to receiving-holes 409); while assembly 700 may be moved, placed, located, and secured in x-axis directions, z-axis directions, and in the y-axis directions (e.g., by varying where hanger-bars 701 are attached to along joists 801).

Figure 9A:
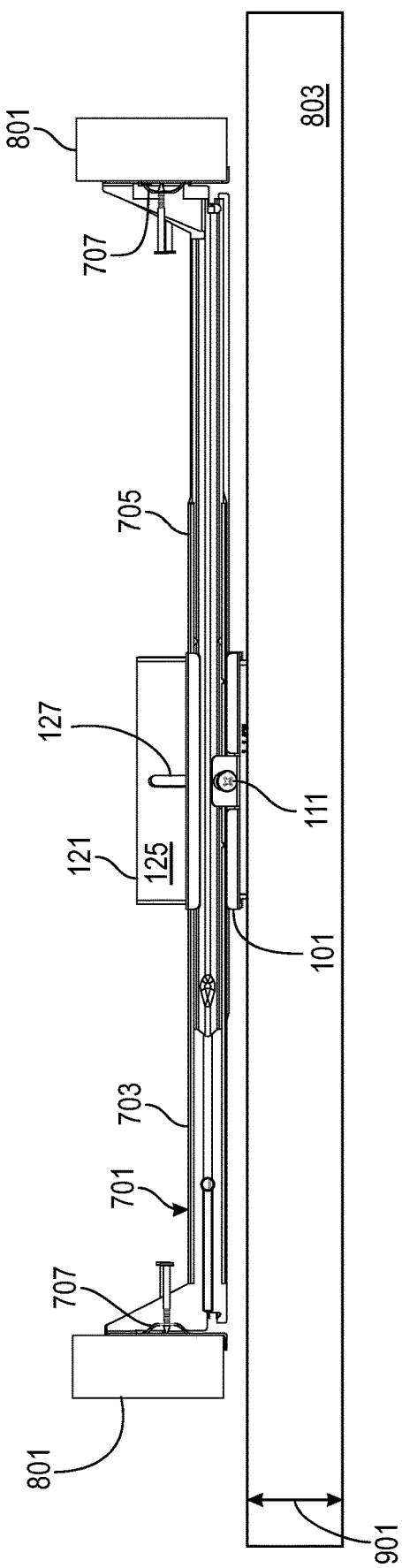
FIG. 9A may depict a side view of FIG. 8 and wherein the ceiling is of a maximum ceiling thickness.

FIG. 9A may depict assembly 700 attached to ceiling joists 801 above a portion of ceiling 803, shown from a side view (or could be a cross-sectional side view through ceiling 803). Ceiling 803 in FIG. 9A may be of a maximum ceiling thickness 901 and assembly 400 may be in the maximum-height 601 configuration (e.g., as shown in FIG. 6B).

Figure 9B:
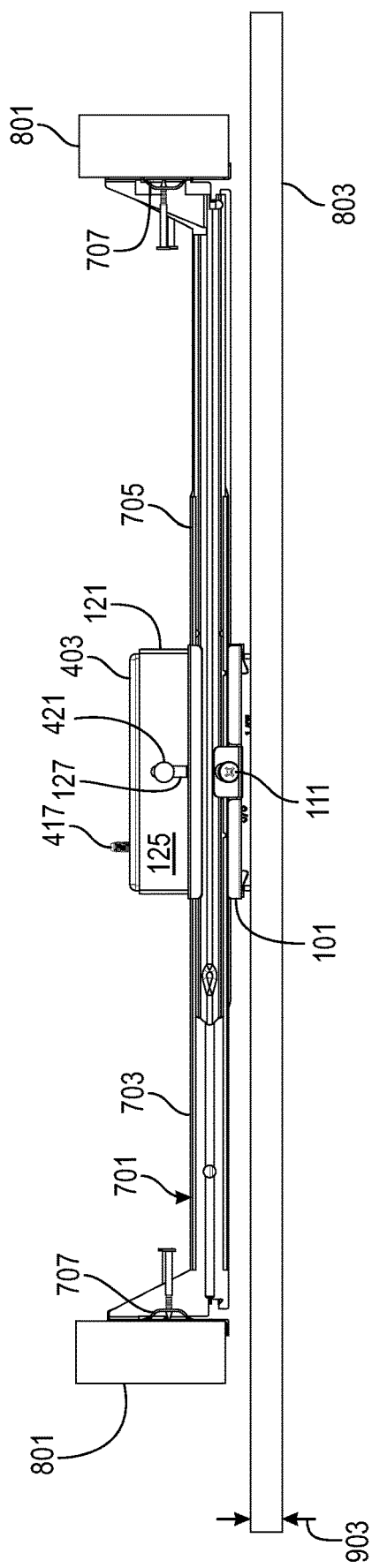
FIG. 9B may depict a side view of FIG. 8 and wherein the ceiling is of a minimum ceiling thickness.

FIG. 9B may depict assembly 700 attached to ceiling joists 801 above a portion of ceiling 803, shown from a side view (or could be a cross-sectional side view through ceiling 803). Ceiling 803 in FIG. 9B may be of a minimum ceiling thickness 903 and assembly 400 may be in the minimum-height 603 configuration (e.g., as shown in FIG. 6C).

Note the very same assembly 700 (or the very same assembly 400) may be shown in both FIG. 9A and in FIG. 9B. That is, the same assembly 700 (or the same assembly 400) may be used to recess box 401 at a same position with respect to ceilings 803 of different thicknesses. In some embodiments, a same assembly 700 (or a same assembly 400) may be used to recess box 401 between a maximum ceiling thickness 901 and a minimum ceiling thickness 903. For example, and without limiting the scope of the present invention, maximum ceiling thickness 901 may be about one and one half inches and minimum ceiling thickness 903 may be about one half inch. Other ceiling 803 thicknesses are contemplated; and for other ceiling 803 thicknesses outside of this particular range (1.5 inches to 0.5 inches), assembly 400 may be manufactured to accommodate that other ceiling 803 thickness.

Note, the screws and/or bolts (e.g., hanger-bar-lock-screw 111 and bolt 421) discussed herein may be thumb and/or wing screws/bolts to facilitate screwing without use of tools.

In some embodiments, the invention may be at least one hanger-bar-to-box-attachment-device 100. In some embodiments, the invention may be at least one box 401. In some embodiments, the invention may be assembly 400. In some embodiments, the invention may be at least one box 401 with two opposing hanger-bar-to-box-attachment-devices 100 removably attached to the at least one box 401. In some embodiments, the invention may be assembly 700. In some embodiments, the invention may be at least one box 401 with two opposing hanger-bar-to-box-attachment-devices 100 removably attached to the at least one box 401 (e.g., using bolts 421, slots 127, and receiving-holes 409); and with two substantially parallel and opposing hanger-bars 701 removably and slidingly attached to the two opposing hanger-bar-to-box-attachment-devices 100 (e.g., via the two opposing hanger-bar-rails 101).

In some embodiments, the invention may be characterized as a system for adjusting a box 401, between a minimum-height 603 and a maximum-height 601, so that box 401 may be set to a specific and/or desired recessed position with respect to a ceiling 803. In some embodiments, this system may comprise one or more of: hanger-bar-to-box-attachment-device 100, box 401, assembly 400, bolt 421, assembly 700, hanger-bar 701, combinations thereof, and/or the like.

In some embodiments, the invention may be characterized as a system for adjusting a box 401, to be recessed with respect to a ceiling 803 at a specific desired height, wherein the system may accommodate box 401 recessed installation with ceilings 803 of different thicknesses, between a range of minimum ceiling thickness 903 and a maximum ceiling thickness 901. In some embodiments, such a system may utilize a pair of hanger-bar-to-box-attachment-devices 100 that are attached to both box 401 and to a pair of hanger-bars 701. The pair of hanger-bar-to-box-attachment-devices 100 may be attached to box 401 in an adjustable manner that is vertically slidable and lockable along a finite vertical path defined by vertical slot 127 in back-plate 121 of hanger-bar-to-box-attachment-device 100. And the pair of hanger-bar-to-box-attachment-devices 100 that are also attached to the pair of hanger-bars 701, may be adjusted in a horizontally slidable and lockable manner along a finite horizontal path, defined by a length of the pair of hanger-bars 701. The box 401 may also have a set of height-markings 411 on its exterior to facilitate adjusting box 401 to a desired height with respect to a given ceiling 803.

In some embodiments, the invention may be characterized as a kit for installing a junction box (e.g., box 401) in a recessed configuration with respect to a ceiling 803. In some embodiments, the kit may comprise one or more of: hanger-bar-to-box-attachment-device 100, box 401, hanger-bar 701, hanger-bar-lock-screw 111, bolt 421, combinations thereof, and/or the like. In some embodiments, the kit may comprise: two hanger-bar-to-box-attachment-devices 100, one box 401, and two hanger-bars 701. In some embodiments, the kit may comprise: two hanger-bar-to-box-attachment-devices 100, one box 401, two hanger-bars 701, and two bolts 421. In some embodiments, the kit may comprise: two hanger-bar-to-box-attachment-devices 100, one box 401, two hanger-bars 701, and two hanger-bar-lock-screws 111. In some embodiments, the kit may comprise: two hanger-bar-to-box-attachment-devices 100, one box 401, two hanger-bars 701, two hanger-bar-lock-screws 111, and two bolts 421.

Note, vertical adjustability contemplated herein in the range of maximum-height 601 to minimum-height 603, may include the endpoints, i.e., may not be limited to being between these endpoints.

Note, vertical adjustability contemplated herein in the range of maximum ceiling thickness 901 to minimum ceiling thickness 903, may include the endpoints, i.e., may not be limited to being between these endpoints.

Hanger-bar-to-box-attachment-devices 100, adjustable recessed boxes 401, hanger-bars 701, combinations thereof, systems, and kits utilizing such have been described. The foregoing description of the at least some various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

While the invention has been described in connection with what is presently considered to be the most practical and at least some preferred embodiments, it is to be understood that the invention is not to be limited to the disclosed embodiments, but on the contrary, is intended to cover various modifications and equivalent arrangements included within the spirit and scope of the appended claims.

What is claimed is:

1. A kit for installing a junction box in a recessed configuration with respect to a ceiling, the kit comprising:
a hanger-bar-to-box-attachment-device that is removably attachable to the junction box and to a hanger-bar;
wherein the hanger-bar-to-box-attachment-device comprises a hanger-bar-rail and a back-plate;
wherein hanger-bar-rail is a rail configured to slidingly and removably engage and hold an elongate portion of the hanger-bar;
wherein a back of the hanger-bar-rail is attached to a front of the back-plate;
wherein the hanger-bar-rail comprises a hanger-bar-receiver-slot and at least one blocking-flange, wherein both the hanger-bar-receiver-slot and the at least one blocking-flange are elongate being longer than wide, wherein the at least one blocking-flange extends from a lengthwise side of the hanger-bar-receiver-slot and away from the back-plate, wherein the back-plate is closer to the hanger-bar-receiver-slot than to the at least one blocking-flange, wherein the hanger-bar-receiver-slot and the at least one blocking-flange in their elongate direction are substantially parallel with each other, wherein where the at least one blocking-flange extends from the hanger-bar-receiver-slot a support is formed that supports the elongate portion of the hanger-bar when the elongate portion of the hanger-bar is within the hanger-bar-rail;
wherein the back-plate comprises a slot that passes entirely through a main-portion of the back-plate, wherein the slot is oriented substantially orthogonal with respect to a length of the hanger-bar-rail, wherein the slot is configured to receive at least a portion of a bolt.

2. The kit according to claim 1, wherein the at least one blocking-flange helps to prevent the elongate portion of the hanger-bar from becoming unintentionally disengaged from the hanger-bar-rail by being a physical barrier to the elongate portion of the hanger-bar.

3. The kit according to claim 1, wherein the hanger-bar-rail comprises a second blocking-flange that is also elongate, being longer than wide, wherein the second blocking-flange extends from an opposite lengthwise side of the hanger-bar-receiver-slot, wherein the back-plate is closer to the hanger-bar-receiver-slot than to the second blocking-flange, wherein the hanger-bar-receiver-slot and the second blocking-flange in their elongate direction are substantially parallel with each other; wherein the at least one blocking-flange and the second blocking-flange extend partially towards each other without touching each other, such that there is a gap between where the at least one blocking-flange ends and where the second blocking-flange ends; wherein the at least one blocking-flange and the second blocking-flange help to prevent the elongate portion of the hanger-bar from becoming unintentionally disengaged from the hanger-bar-rail.

4. The kit according to claim 1, wherein the hanger-bar-rail comprises a flange-for-locking that is a flange that extends from a side of the hanger-bar-receiver-slot, wherein the flange-for-locking comprises a receiving-hole that passes entirely through the flange-for-locking, wherein the receiving-hole is configured to receive at least a portion of a hanger-bar-lock-screw, that is a screw; wherein when the elongate portion of the hanger-bar is engaged and held by the hanger-bar-rail, tightening of the hanger-bar-lock-screw against the elongate portion of the hanger-bar stops sliding translation of the elongate portion of the hanger-bar with respect to the hanger-bar-rail.

5. The kit according to claim 4, wherein the kit further comprises the hanger-bar-lock-screw.

6. The kit according to claim 1, wherein the slot of the back-plate is at least seventy five percent entirely bound.

7. The kit according to claim 1, wherein the main-portion of the back-plate is a substantially planar member that is substantially parallel with the length of the hanger-bar-rail, wherein the back-plate comprises two oppositely disposed end-brackets, wherein each such end-bracket extends orthogonally away from the main-portion of the back-plate at each opposite lengthwise end of the main-portion of the back-plate, wherein each such end-bracket also extends away from the hanger-bar-rail, wherein between the two oppositely disposed end-brackets a portion of the junction box is receivable.

8. The kit according to claim 1, wherein the kit further comprises the junction box.

9. The kit according to claim 8, wherein the junction box on an exterior surface comprises a set of height-markings, wherein each height-marking selected from the set of height-markings corresponds to a particular and predetermined thickness of ceiling.

10. The kit according to claim 9, wherein at least a portion of a length of the slot is sized to correspond to a height of the set of height-markings, such that when the hanger-bar-to-box-attachment-device is attached to the junction box, the height-marking selected from the set of height-markings that is just covered by a bottom of the hanger-bar-to-box-attachment-device indicates the particular and predetermined thickness of ceiling that the junction box should be installed with to achieve the recessed configuration of the junction box.

11. The kit according to claim 8, wherein the junction box is substantially enclosed on all but one side that is a main-opening to the junction box.

12. The kit according to claim 8, wherein the junction box comprises a top, two oppositely disposed sides, a front, a rear, and a substantially open bottom; wherein the substantially open bottom is disposed opposite of the top; wherein the two oppositely disposed sides, the front, and the rear extend substantially orthogonally away from the top towards the substantially open bottom.

13. The kit according to claim 8, wherein the junction box on an exterior surface comprises a receiving-hole that is configured to removably receive a distal portion of the bolt; wherein when the receiving-hole has received the distal portion of the bolt and the at least the portion of the bolt is passing through the slot, the hanger-bar-to-box-attachment-device is removably attached to the junction box and a position of the junction box is adjustable along at least a portion of a length of the slot.

14. The kit according to claim 13, wherein the bolt, the slot in the main-portion of the back-plate, and the receiving-hole in the junction box permit the junction box to be slidingly adjustable and tightened along the at least the portion of the length of the slot.

15. The kit according to claim 1, wherein the kit further comprises a second hanger-bar-to-box-attachment-device that is removably attachable to the junction box.

16. The kit according to claim 1, wherein the kit further comprises the bolt.

17. The kit according to claim 1, wherein the kit further comprises the hanger-bar, wherein opposite ends of the hanger-bar are configured to be attachable to two different and adjacent joists.

18. The kit according to claim 1, wherein the kit further comprises: the hanger-bar, a second-hanger-bar, a second hanger-bar-to-box-attachment-device, and the junction box; wherein the second hanger-bar-to-box-attachment-device is removably attachable to both the second-hanger-bar and the junction box.

19. A kit for installing a junction box in a recessed configuration with respect to a ceiling, the kit comprising:
the junction box, wherein the junction box on an exterior side, not top, comprises a set of height-markings, wherein each height-marking selected from the set of height-markings corresponds to a particular and predetermined thickness of the ceiling;
a hanger-bar-to-box-attachment-device that is removably attachable to the junction box and to a hanger-bar;
wherein the hanger-bar-to-box-attachment-device comprises a hanger-bar-rail and a back-plate;
wherein hanger-bar-rail is a rail configured to slidingly and removably engage and hold an elongate portion of the hanger-bar;
wherein a back of the hanger-bar-rail is attached to a front of the back-plate;
wherein the back-plate comprises a slot that passes entirely through a main-portion of the back-plate, wherein the slot is oriented substantially orthogonal with respect to a length of the hanger-bar-rail, wherein the slot is configured to receive at least a portion of a bolt;
wherein at least a portion of a length of the slot is sized to correspond to a height of the set of height-markings, such that when the hanger-bar-to-box-attachment-device is attached to the junction box, the height-marking selected from the set of height-markings that is just covered by a bottom of the hanger-bar-to-box-attachment-device indicates the particular and predetermined thickness of ceiling that the junction box should be installed with to achieve the recessed configuration of the junction box.

20. A kit for installing a junction box in a recessed configuration with respect to a ceiling, the kit comprising:
a hanger-bar-to-box-attachment-device that is removably attachable to the junction box and to a hanger-bar;
wherein the hanger-bar-to-box-attachment-device comprises a hanger-bar-rail and a back-plate;
wherein hanger-bar-rail is a rail configured to slidingly and removably engage and hold an elongate portion of the hanger-bar;
wherein a back of the hanger-bar-rail is attached to a front of the back-plate;
wherein the back-plate comprises a slot that passes entirely through a main-portion of the back-plate, wherein the slot is oriented substantially orthogonal with respect to a length of the hanger-bar-rail, wherein the slot is configured to receive at least a portion of a bolt;

the junction box, wherein the junction box on an exterior surface comprises a receiving-hole that is configured to removably receive a distal portion of the bolt; wherein when the receiving-hole has received the distal portion of the bolt and the at least the portion of the bolt is passing through the slot, the hanger-bar-to-box-attachment-device is removably attached to the junction box and a position of the junction box is adjustable along at least a portion of a length of the slot.

* * * * *